D. PLUMER.
ROLLER ATTACHMENT FOR GANG PLOWS.
APPLICATION FILED FEB. 11, 1919.

1,298,385.

Patented Mar. 25, 1919.

WITNESS:
R. R. Ritchel.

INVENTOR
Davenport Plumer
BY
Augustus B. Stoughton
ATTORNEY.

UNITED STATES PATENT OFFICE.

DAVENPORT PLUMER, OF THREE TUNS, PENNSYLVANIA.

ROLLER ATTACHMENT FOR GANG-PLOWS.

1,298,385.

Specification of Letters Patent.

Patented Mar. 25, 1919.

Application filed February 11, 1919. Serial No. 276,291.

*To all whom it may concern:*

Be it known that I, DAVENPORT PLUMER, a citizen of the United States, residing at Three Tuns, Montgomery county, Pennsylvania, have invented a certain new and useful Roller Attachment for Gang-Plows, of which the following is a specification.

The principal object of the present invention is to provide a simple, reliable, convenient and comparatively inexpensive roller attachment for gang plows.

The invention will be claimed at the end hereof but will be first described in connection with the embodiment of it chosen for illustration in the accompanying drawings forming part hereof and in which—

Figure 1:
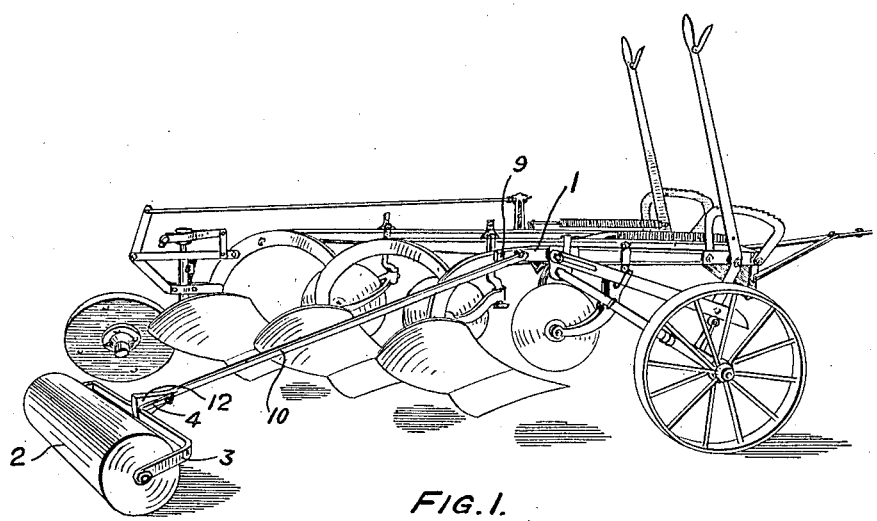
Figure 1, is a perspective view of a roller attachment for gang plows embodying features of the invention.
Figure 2:
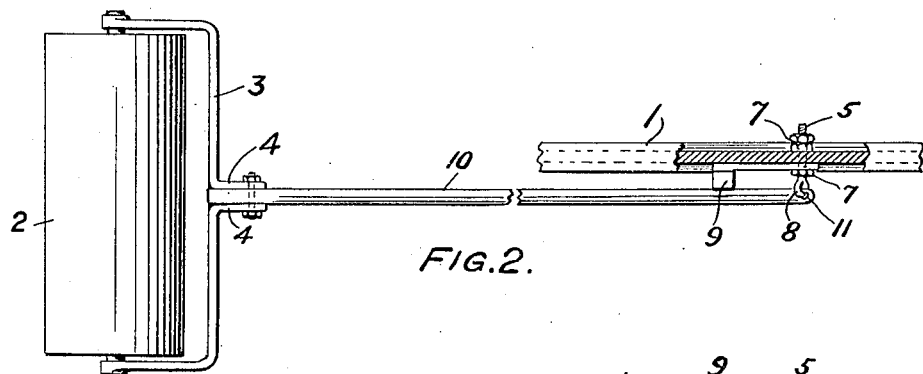
Fig. 2 is a top or plan view partly in section illustrating details of construction.
Figure 3:
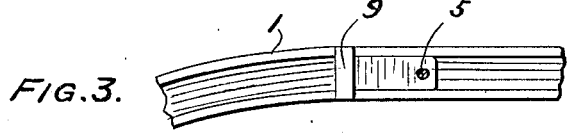
Fig. 3, is a side view partly in section.
Figure 4:
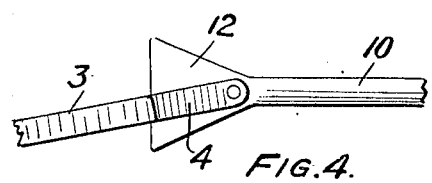
Fig. 4, is a side view illustrating a detail.
Figure 5:
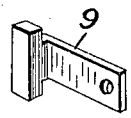
Fig. 5, is a perspective view.

In the drawings 1, is the plow-beam of the plow on the furrow side of the gang of plows. 2, is a land roller having a yoke 3, provided with parallel ears 4. 5, is a pivot fitting attached to the furrow side of the plow-beam 1, and adjustable crosswise thereof. This fitting is shown to comprise an eye-bolt adjustable through the beam 1, by means of nuts 7, and having its eye 8, arranged to project from the furrow side of the beam. 9, is a stop on the furrow side of the plow-beam in rear of the pivot fitting. As illustrated the stop is provided with a plate that fills the channel in the plow-beam. This stop 9, is shown as bolted to the furrow side of the plow-beam by the bolts of the pivot fitting 5. 10, is a rigid pole pivotally connected with the pivot fitting 5, and loosely abutting on the stop 9. As shown the pole 10, is provided with an aperture or hole 11, in which works the eye 8. 12, is a fan shaped end of the pole and it is pivoted between the ears 4, and serves to maintain proper alinement even if the ears 4 should drop toward the ground.

In use the slight inclination of the pole 10, in respect to the normal line of draft of the plow causes the pole to abut upon and press against the stop 9, and so the roller 2, is held and drawn in its proper straight path for operating upon the earth turned up by the plow, and any adjustment that may be necessary or desirable in the path of the roller can be made by adjusting the pivot fitting 5, in respect to the stop 9, thereby changing the inclination of the pole 10, in respect to the beam 1.

Plows are usually turned to the right and when this is done the pole 10, can swing clear of the stop 9, and so the turning of the roller 2, is facilitated, although the plow can be turned to the left in which case the pole bears up against the stop on the side of the beam 1, and so keeps the roller in proper position.

While I have described the invention in connection with a land roller, it is evident that other argicultural implements. such for example as a harrow might be substituted for the land roller.

I claim:

1. In a roller attachment for gang plows the combination of a plow-beam, a land roller having a yoke provided with parallel ears, a pivot-fitting on the furrow side of the plow-beam and adjustable crosswise thereof, a stop at the furrow side of the plow-beam in rear of the pivot fitting. and a pole pivotally connected with the pivot-fitting and loosely abutting on the stop and having a fan shaped end pivoted between said ears, substantially as described.

2. In a roller attachment for gang plows the combination of a plow-beam, a land roller, a pole attached to the roller and pivoted to the beam and adapted to swing free thereof in one lateral direction, and a stop disconnected from the pole and arranged on the beam for limiting the angular relation of the pole and beam in the other direction.

3. In a roller attachment for gang plows the combination of a plow-beam, a land roller, a pole attached to the roller and pivoted to the beam and adapted to swing free thereof in one lateral direction, a stop disconnected from the pole and arranged on the beam for limiting the angular relation of the pole and beam in the other direction, and means for relatively adjusting the stop and pivot point of the pole to vary the angular relation of the pole and beam.

4. In an attachment for gang plows the combination of a plow-beam, an agricultural implement, a pivot-fitting on the furrow side of the plow-beam and adjustable crosswise thereof, a stop at the furrow side of the plow-beam in rear of the pivot fitting, and a pole pivotally connected with the pivot-fitting and loosely abutting on the stop and connected with the agricultural implement.

DAVENPORT PLUMER.

Copies of this patent may be obtained for five cents each, by addressing the "Commissioner of Patents, Washington, D. C."